United States Patent [19]

Piper

[11] Patent Number: 5,622,098
[45] Date of Patent: Apr. 22, 1997

[54] HIGH PRESSURE CYLINDER WITH LOCKING END CAPS

[75] Inventor: Gregg J. Piper, Waukesha, Wis.

[73] Assignee: Amalga Composites, Inc., West Allis, Wis.

[21] Appl. No.: 613,146

[22] Filed: Mar. 8, 1996

[51] Int. Cl.[6] .................................................. F01B 29/00
[52] U.S. Cl. ............................ 92/128; 92/164; 92/169.1; 92/170.1; 29/888.06; 403/370
[58] Field of Search .............................. 92/169.1, 170.1, 92/164, 128; 29/888.06, 888.061; 403/370, 371

[56] References Cited

U.S. PATENT DOCUMENTS

| | | | |
|---|---|---|---|
| 1,710,416 | 4/1929 | Goeller | 403/370 |
| 2,274,458 | 2/1942 | Peterson et al. | 92/128 |
| 2,714,522 | 8/1955 | Becker | 92/128 |
| 3,334,773 | 8/1967 | Bimba | 220/39 |
| 4,085,661 | 4/1978 | Schriever | 92/170 |
| 4,160,608 | 7/1979 | Derner et al. | 403/370 |
| 4,211,149 | 7/1980 | Hrusch | 92/27 |
| 4,421,293 | 12/1983 | Koch et al. | 251/61.4 |
| 4,562,798 | 1/1986 | van Os | 123/193 CH |
| 4,628,796 | 12/1986 | Wallis | 92/117 |
| 4,664,362 | 5/1987 | Hennells | 267/119 |
| 4,757,751 | 7/1988 | Munoz | 92/165 |
| 4,815,360 | 3/1989 | Winterle | 92/255 |
| 4,867,043 | 9/1989 | Antkowiak | 92/165 |
| 4,924,758 | 5/1990 | Yuda | 92/128 |
| 5,070,767 | 12/1991 | Yuda | 92/128 |
| 5,117,743 | 6/1992 | Yuda | 92/128 |
| 5,316,445 | 5/1994 | Snetting et al. | 417/53 |
| 5,375,507 | 12/1994 | Kladiwa et al. | 29/888.06 |
| 5,415,079 | 5/1995 | Ching | 92/170.1 |
| 5,465,647 | 11/1995 | Fish | 92/128 |
| 5,471,909 | 12/1995 | Kobelt | 92/161 |

FOREIGN PATENT DOCUMENTS

| | | | |
|---|---|---|---|
| 2601138 | 7/1977 | Germany | 403/370 |
| 1402250 | 8/1975 | United Kingdom | 403/370 |

*Primary Examiner*—Thomas E. Denion
*Attorney, Agent, or Firm*—Whyte Hirschboeck Dudek S.C.

[57] ABSTRACT

The invention includes a light-weight, high pressure cylinder, and a method of producing such a cylinder. The pressure cylinder uses a composite pressure barrel for maintaining and distributing fluid pressure therein. The composite barrel has tapered ends for retaining a pair of end caps. A split tapered collar having a taper matching that of the tapered end of the pressure barrel is provided to lock the end caps to the pressure barrel. The tapered collar has a threaded outer diameter for receiving the threaded end cap. The combination of the tapered collar and the tapered end of the pressure barrel provide a wedge when the end cap is threadedly engaged to the collar. By applying torque to the end cap, the two tapered surfaces are forced together and the end cap is locked to the composite barrel to maintain internal fluid pressure.

17 Claims, 2 Drawing Sheets

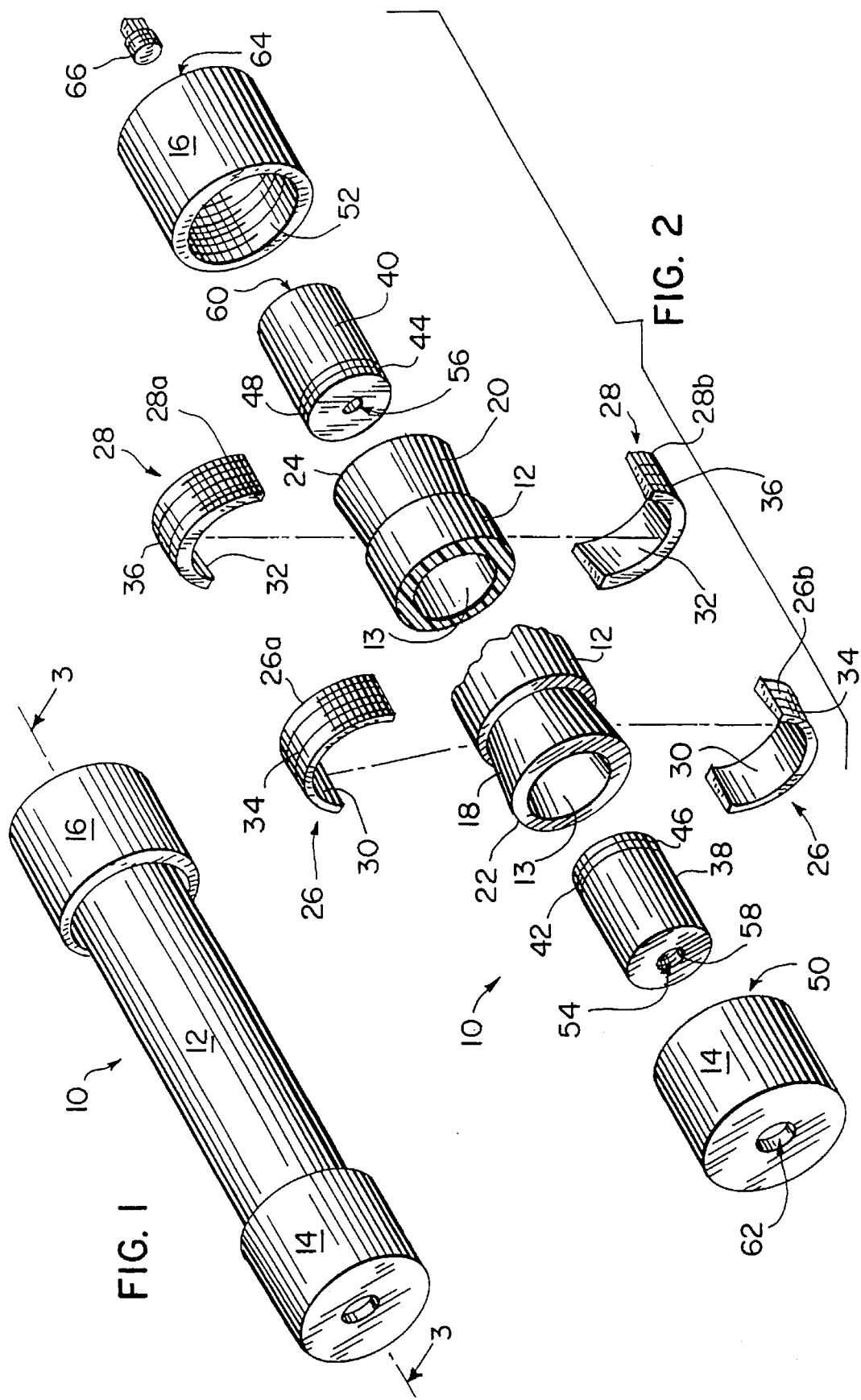

HIGH PRESSURE CYLINDER WITH LOCKING END CAPS

BACKGROUND OF THE INVENTION

The present invention relates generally to connecting an end cap to a pressure cylinder, and more particularly to a pressure cylinder using a composite pressure barrel with tapered ends and a metal split tapered collar for interlocking a steel end cap to the composite barrel. The pressure cylinder of the present invention is particularly useful in pneumatic and hydraulic applications, or in general terms, fluid power distribution.

Typically, metal pressure cylinders can be constructed with threaded end caps or with the use of retaining tie-rods. Because steel has a high shear stress, these types of cylinders can be used at pressures up to and exceeding 10,000 psi. However, there are many drawbacks to using steel for pressure cylinders, including corrosion caused by contaminants carried in the fluid, excess weight, and high costs of fabrication and machining.

Although the tie-rod construction has become more common place, the threaded end cap design may still be found in lower pressure metal cylinder applications. The threaded end cap design has threads cut in the outer periphery of the steel barrel to accommodate mating with a threaded steel end cap to retain internal pressure.

The tie-rod design uses flat end caps and has multiple tie-rods extending the length of the fluid cylinder for bolting the end caps together about the outer periphery of the cylinder. The tie-rod design adds additional weight, excess costs, and provides a large and bulky pressure cylinder. A further disadvantage is that since the rods, washers, and nuts are typically all steel, excessive corrosion occurs to these assembly pieces when exposed in corrosive operating environments.

To overcome the disadvantages of using steel, some manufacturers have investigated the use of composite tubing for the barrel of the pressure cylinder. However, because composite materials typically have low shear stress properties, it is not practical to thread such composites and attempt to distribute the force of internal pressure through the threads to a threaded end cap. Any degree of high internal pressure will ultimately result in failure of the composite threads.

Alternatively, prior art attempts to use composite pressure cylinders have relied on the tie-rod design, and as previously discussed, the use of the tie-rod and flat cap design adds excess weight and costs to the pressure cylinder, as well as resulting in large and bulky pressure cylinders. Further, since the rods, washers, and nuts are typically all steel, corrosive operating environments cause excessive corrosion to these assembly pieces, resulting in added costs when repairing the pressure cylinders, and when disassembling for regular maintenance.

Therefore, it would be desirable to have a pressure cylinder and end cap assembly using a composite pressure barrel with minimal metallic assembly pieces that could withstand burst pressures exceeding 12,000 psi.

SUMMARY OF THE INVENTION

The present invention overcomes the aforementioned problems, and provides such a high pressure cylinder and end cap assembly using a composite pressure barrel, while not relying on the low shear stress properties of composite threads.

In accordance with one aspect of the invention, a pressure cylinder and end cap assembly is disclosed having a pressure barrel with at least one tapered end and an internal bore. The pressure barrel is comprised of a composite material sufficient to maintain and distribute fluid pressure therein. A split collar is provided which has a tapered inner diameter matched to engage the tapered outer diameter of the pressure barrel. The split collar has a threaded outer diameter to match and engage a threaded inner diameter of an end cap. The split collar is placed about the tapered end of the composite barrel. As the end cap is threadedly engaged to the split collar and is thereafter tightened, the corresponding tapers of the split collar and pressure barrel form a wedge, thereby locking the end caps to the composite barrel.

In accordance with another aspect of the invention, a method of producing a light weight fluid pressure cylinder is disclosed. The method includes the steps of tapering an end of a filament wound fiberglass reinforced epoxy resin barrel such that the larger end of the taper is at the end of the barrel, and tapering an inner diameter of a collar to substantially match the taper of the barrel. The method also includes threading the outer diameter of the collar and splitting the collar in at least two sections for placement about the tapered end of the barrel. The method next includes the step of sealing an inner diameter of the barrel, threading an inner diameter of an end cap to substantially match the threaded outer diameter of the collar, and engaging the threaded end cap to the threaded collar to form a sealed pressure cylinder.

One object of the present invention is to provide a pressure cylinder that is substantially corrosion free in the areas of fluid contact using composite tubing, while providing the capability of maintaining high internal pressure.

Another object of the present invention is to provide a pressure cylinder and end cap design that minimizes weight, while simplifying assembly, as well as future disassembly for repairs and maintenance.

Yet another object of the present invention is to provide a pressure cylinder and end cap assembly using a nonmetallic pressure barrel that allows the use of electrical positioning sensors inside the cylinder, wherein the pressure barrel does not cause electrical interference with the sensor.

A still further object of the invention is to provide a pressure cylinder and end cap design that is usable in the food industry by minimizing the sites for bacteria growth, as well as providing a pressure cylinder operable in corrosive environments.

The invention as herein described, can be used with any fluid cylinder, whether pneumatic or hydraulic. The pressure cylinder of the present invention can be used in such applications as actuators, cylinder presses, pressure storage applications, or the like.

Various other features, objects, and advantages of the invention will be made apparent from the following detailed description and the drawings.

BRIEF DESCRIPTION OF THE DRAWINGS

The drawings illustrate the best mode presently contemplated for carrying out the invention. In the drawings:

FIG. 1 is a perspective view of the pressure cylinder and end cap assembly of the present invention.

FIG. 2 is a perspective, exploded view of a portion of the device of FIG. 1.

DETAILED DESCRIPTION OF THE PREFERRED EMBODIMENT

Figure 3:
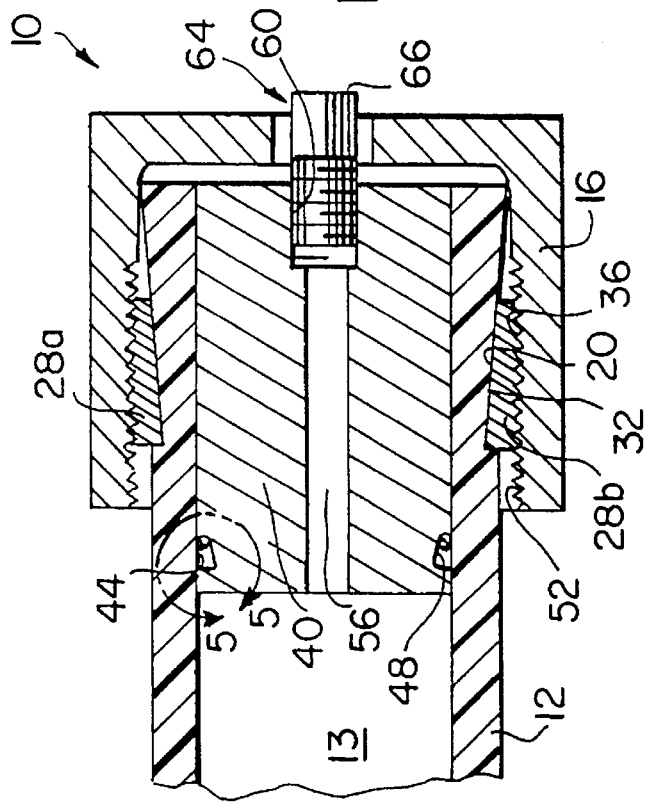
FIG. 3 is a partial side view in cross-section of the device of FIG. 1 taken along line 3—3 of FIG. 1.

FIG. 1 shows a pressure cylinder and end cap assembly 10 having a pressure barrel 12 and a pair of end caps 14 and 16 in locking relation with pressure barrel 12 for maintaining and distributing fluid pressure therein, in accordance with the present invention. As best shown in FIG. 2, pressure barrel 12, shown in section, has a hollow center or bore 13, and tapered ends 18, 20. The tapered ends 18, 20 each have a tapered outer diameter largest at ends 22 and 24 of the pressure barrel 12.

A split collar 26 engages the tapered end 18, and a split collar 28 engages the tapered end 20. The split collar 26 is preferably sectioned in two, providing a first collar 26a and a second collar 26b. Similarly, split collar 28 is sectioned and has first collar 28a and a second collar 28b. Although shown in a preferred two-piece split collar arrangement, it is contemplated that the collars could be sectioned in any multiple number of pieces deemed practical. Likewise, the split collars are not limited to encircling the entire circumference of tapered ends 18 and 20. In other words, the split collars 26 and 28, when placed over tapered ends 18 and 20, may allow the formation of a gap between the first and second collars.

Split collar 26 has a tapered inner diameter 30 having an angle of taper substantially matching that of the tapered end 18 of pressure barrel 12. Similarly, split collar 28 has a tapered inner diameter 32 having an angle of taper substantially matching that of the tapered end 20 of the pressure barrel 12. Split collars 26 and 28 have threaded outer diameters 34 and 36, respectively, which are best shown in FIG. 3. It has been found that a 6° angle of taper for tapered ends 18 and 20, along with a matching taper on the inner diameter of collars 26 and 28, provides satisfactory strength and retention.

Referring back to FIG. 2, a pair of internal sealing plugs 38 and 40 are provided, and have O-rings 42 and 44 in O-ring grooves 46 and 48, respectively. The internal sealing plugs 38 and 40 engage the bore 13 of pressure barrel 12, wherein the O-rings 42 and 44 form a seal between pressure barrel 12 and sealing plugs 38 and 40. Sealing plugs 38 and 40 have passages 54 and 56, each having a threaded inside diameter 58 and 60 at a rear end thereof.

End caps 14 and 16 have a threaded inner diameter 50 and 52 for engagement with the threaded outer diameters 34 and 36 of split collars 26 and 28, respectively. End caps 14 and 16 also have passages 62 and 64 providing access to the threaded inside diameters 58 and 60 of sealing plugs 38 and 40 to accommodate fluid communication with bore 13 of pressure barrel 12. A plug 66 or fluid supply fitting (not shown) is threadedly engaged with the threaded inside diameter of passages 54 and 56. Although sealing plugs 38 and 40 are shown separately from end caps 14 and 16, it is contemplated that they may be integrated. For example, sealing plug 38 may be integrally incorporated with end cap 14 to provide a one-piece end cap and sealing plug.

FIG. 3 shows a cross-sectional assembled view of pressure cylinder and end cap assembly 10. The pressure barrel 12 maintains and distributes fluid pressure in bore 13 and has tapered ends 18 and 20. End caps 14 and 16 engage the tapered ends 18 and 20 via collars 26 and 28. The threaded inner diameters 50 and 52 of end caps 14 and 16 engage the threaded outer diameter 34 and 36 of collars 26 and 28. A wedge is formed by the tapered inner diameters 30 and 32 of collars 26 and 28 against the tapered ends 18 and 20 of pressure barrel 12. As the end caps 14 and 16 are tightened, the split collars 26 and 28 are drawn tightly against the tapered ends of pressure barrel 12. As is evident, this wedging function prevents movement of the end caps when pressure barrel 12 has internal pressure, without the use of threads on the composite pressure barrel 12.

Figure 4:
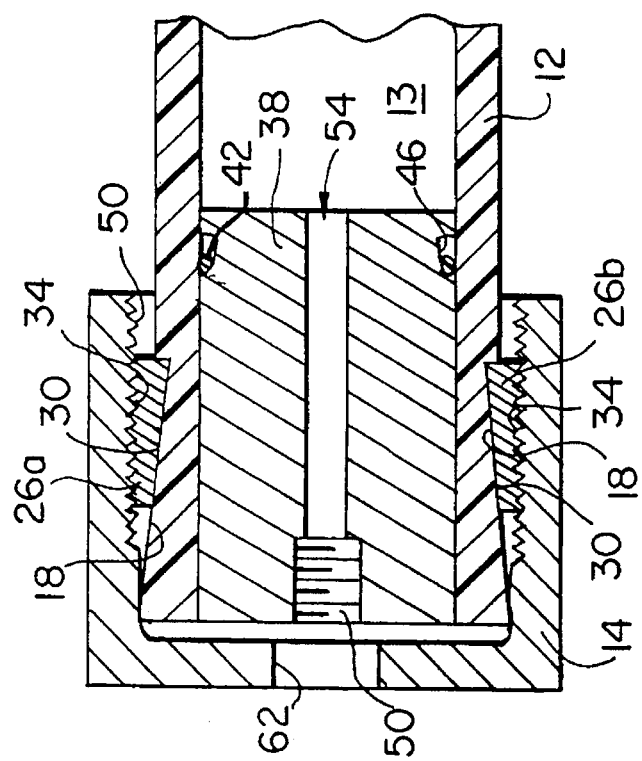
FIG. 4 is a side view of a portion of FIG. 1 in a preferred embodiment.

FIG. 4 shows a side view of pressure barrel 12 comprised of a filament wound composite, preferably fiberglass filament and epoxy resin. However, it is understood that many other composite materials may be used with the present invention, such as carbon fiber and epoxy resin, or any other composite material. Extensive testing has found that a fiberglass wind angle 68 of 43°, as measured from the longitudinal axis 70, provides an optimal angle for winding fiberglass filament for the pressure barrel of the present invention. The 43° wind angle is somewhat of a compromise between competing radial and longitudinal forces and manufacturability. If the wind angle is decreased, the strength in the longitudinal direction is increased, but with a sacrifice in strength in the radial direction. Conversely, if the wind angle is increased the radial strength is increased, but with a corresponding loss in longitudinal strength. The 43° wind angle is a trade off between retaining high internal pressure, while maintaining adequate tensile force along the axis of the pressure barrel. Accordingly, one skilled in the art will recognize that the wind angle may vary depending on specific needs.

Figure 5:
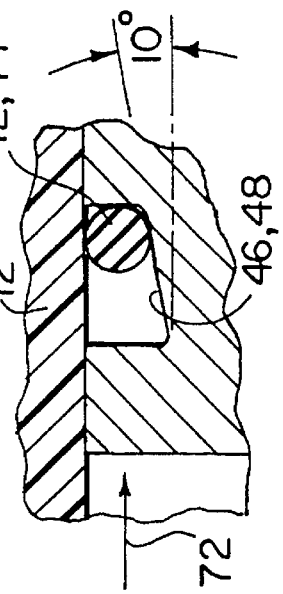
FIG. 5 is a partial side view in cross-section taken along line 5—5 of FIG. 3.

As shown in FIG. 5, preferably the O-ring grooves 46 and 48 are tapered at a 10° angle to provide a more shallow groove in the direction of internal pressure against O-rings 42 and 44, as shown by arrow 72, thereby forming an increasing positive seal as internal pressure increases.

In the preferred embodiment, pressure barrel 12 is comprised of a fiberglass and epoxy resin composite and internal sealing plug 38 is comprised of aluminum, while cap 14 and collar 26 are made of steel. This arrangement provides a light weight pressure cylinder having substantially non-corrosive materials in contact with the internal fluids, while providing steel where tensile strength is desired. It has been found that this arrangement withstands internal pressure of at least 12,500 psi. Other equivalent materials may be substituted for steel and aluminum, as long as the requisite tensile strength and non-corrosive properties, respectively, are achieved.

It is important to realize that the pressure barrel and end cap assembly is shown in the figures with all the essential parts of the invention. In an application however, a piston or actuator and corresponding seals would be installed inside pressure barrel 12. The internal passages of the internal sealing plugs and the end caps may be enlarged to allow for actuator movement therein, all as is well known in the art, and therefore not shown or described in any further detail.

A method of producing a light weight fluid pressure cylinder is also disclosed. The method includes tapering at least one end of a fiberglass wound epoxy resin barrel such that the largest end of the taper is at the end of the barrel, and tapering an inner diameter of a collar to substantially match the taper of the barrel. The method also includes threading the outer diameter of the collar and splitting the collar into sections for placement about the tapered end of the barrel. The method further includes threading an inner diameter of an end cap to substantially match the threaded outer diameter of the collar, sealing the inner diameter of the barrel, and engaging the threaded end cap to the threaded collar to form a sealed pressure cylinder.

It is recognized that other equivalents, alternatives, and modifications, aside from those expressly stated, are possible and within the scope of the appending claims.

I claim:

1. A pressure cylinder and end cap assembly comprising:

a pressure barrel having at least one tapered end, and an internal bore;

a split collar having an inner diameter tapered to engage the tapered end of the pressure barrel and a threaded outer diameter; and an end cap having a threaded inner diameter engaging the threaded split collar.

2. The pressure cylinder and end cap assembly of claim 1 further comprising an internal sealing plug engageable with the internal bore of the pressure barrel.

3. The pressure cylinder and end cap assembly of claim 2 further comprising an o-ring and wherein the internal sealing plug has an O-ring groove on an outer diameter to receive the o-ring for sealing the pressure cylinder.

4. The pressure cylinder and end cap assembly of claim 3 wherein the O-ring groove is tapered to provide a smaller groove in a direction of internal pressure against the o-ring, thereby forming an increasing positive seal as internal pressure increases.

5. The pressure cylinder and end cap assembly of claim 1 wherein the pressure barrel is comprised of a composite material.

6. The pressure cylinder and end cap assembly of claim 5 wherein the composite material comprises a fiberglass and epoxy resin composite.

7. The pressure cylinder and end cap assembly of claim 6 wherein a wind angle of the fiberglass is approximately 43° from a longitudinal axis of the pressure barrel.

8. The pressure cylinder and end cap assembly of claim 1 where in the split collar is a two-piece split collar.

9. The pressure cylinder and end cap assembly of claim 5 wherein the end cap and split collar are comprised of steel.

10. The pressure cylinder and end cap assembly of claim 2 where in the sealing plug is comprised of aluminum.

11. A pressure cylinder and end cap assembly comprising:

a pressure barrel for maintaining and distributing fluid pressure therein, wherein the pressure barrel has at least one tapered end having a tapered outer diameter largest at the end of the pressure barrel;

an end cap for engaging the tapered end of the pressure barrel, the end cap having a threaded inner diameter;

a collar for holding the end cap to the pressure barrel, the collar comprising a tapered inner diameter having an angle of taper substantially matching that of the tapered and of the pressure barrel, and a threaded outer diameter having threads substantially matching those of the end cap; and wherein the combination of the tapered inner diameter of the collar and the tapered outer diameter of the pressure barrel provide a wedge when the end cap is threadedly engaged to the collar.

12. The pressure cylinder and end cap assembly of claim 11 further comprising a sealing plug having an o-ring groove and an o-ring therein, the sealing plug fitting into the pressure barrel with the o-ring sealing fluid pressure therein.

13. The pressure cylinder and end cap assembly of claim 12 wherein the o-ring groove is tapered for providing positive sealing with increasing pressure in the pressure barrel.

14. The pressure cylinder and end cap assembly of claim 11 wherein the pressure barrel is comprised of light weight composite material and the end cap and collar are comprised of hardened metal.

15. The pressure cylinder and end cap assembly of claim 11 wherein the angle of taper is 6°.

16. The pressure cylinder and end cap assembly of claim 11 wherein the pressure barrel is comprised of a filament wound at a 43° angle from a longitudinal axis of the pressure barrel.

17. A method of producing a light weight fluid pressure cylinder comprising the steps of:

tapering at least one end of a filament wound fiberglass reinforced epoxy resin barrel such that a largest end of the taper is at the end of the barrel;

tapering an inner diameter of a collar to substantially match the taper of the barrel;

threading an outer diameter of the collar;

splitting the collar in at least two sections for placement about the tapered end of the barrel;

threading an inner diameter of an end cap to substantially match the threaded outer diameter of the collar;

sealing an inner diameter of the barrel; and engaging the threaded end cap to the threaded collar to form a sealed pressure cylinder.

* * * * *